United States Patent Office 2,850,290
Patented Sept. 2, 1958

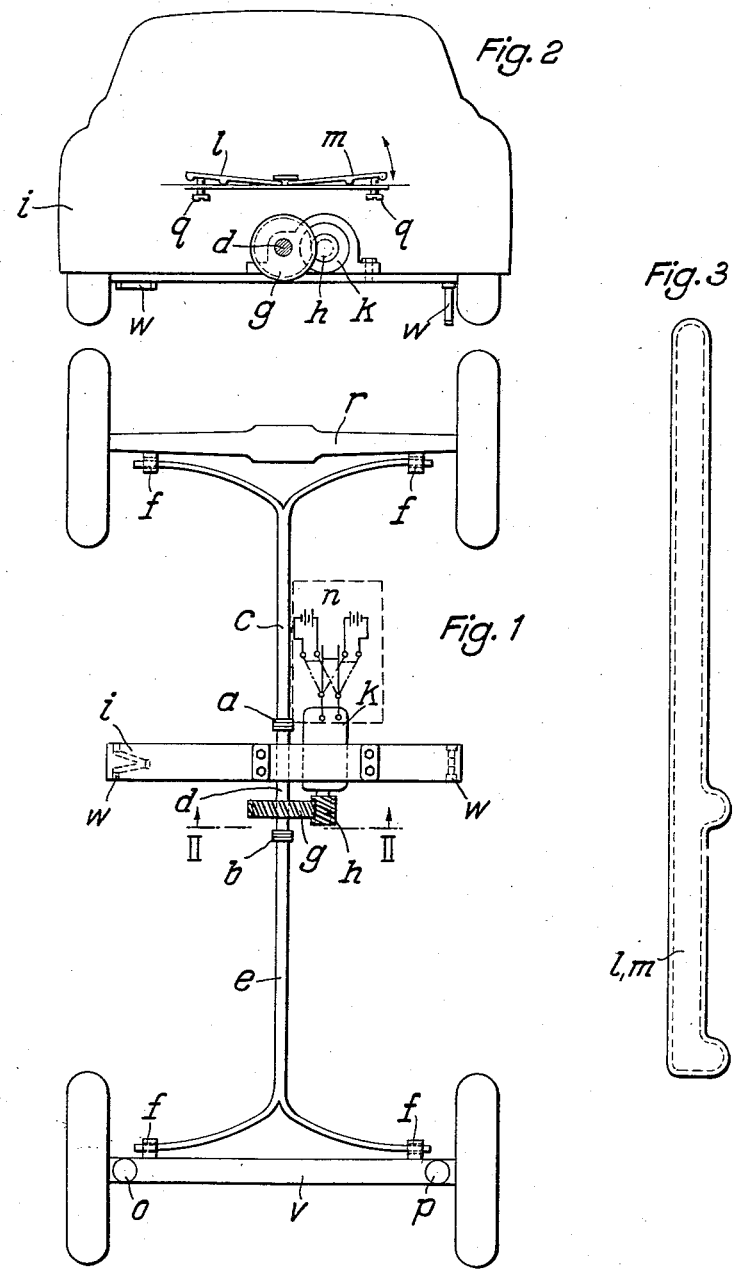

2,850,290

DEVICE FOR STABILIZING MOTOR VEHICLE BODIES AND FOR INFLUENCING THE LATERAL INCLINATION THEREOF

Gerhard Borgmann, Berlin-Dahlem, Germany

Application August 24, 1954, Serial No. 451,879

Claims priority, application Germany November 6, 1953

10 Claims. (Cl. 280—112)

The present invention relates to a device for influencing the inclination of the bodies of motor vehicles in which the front and rear axles are connected by a torsion bar through which a lateral inclination and a stabilization of the vehicle body may be obtained by means of a motive force which may be produced, for example, by an electric motor.

It is an object of the invention to obtain a correct inclination of the bodies of motor vehicles relative to the centre of gravity when the vehicle is being driven on a crowned road or through turns, and independently of the type of wheel suspension, with beam axles as well as with swinging axles. This is achieved by connecting the front and rear axles by a single torsion bar which is arranged in the central longitudinal plane of the vehicle and is adapted to be twisted by a motor, for example an electric motor, in such a manner that the vehicle body, after having been swung out of the correct position relative to the centre of gravity by centrifugal force, uneven loading or the curvature of the road surface, is returned into its correct position.

It is another object of the invention to make the device described above suitable for simultaneous use as a lifting jack. This is accomplished by providing means for selectively switching on the motor acting on the torsion bar, and by providing pivotable downwardly hinging supports on both sides of the vehicle body.

Devices are known, in which the inclination of the vehicle body is influenced by various means, but all of these constructions are very complicated. The device according to the invention differs from these known constructions insofar, as it is very simple and inexpensive to manufacture without presenting the various drawbacks of other constructions, such as affecting the wheel position, disturbing the suspension characteristics, etc. In comparison to the prior art it becomes especially obvious that an important advantage of the device according to the invention resides in the fact, that it may be used with all known types of wheel suspension and may also be subsequently installed in existing vehicles. Furthermore, it permits a very simple construction of the vehicle lifting jack.

A preferred embodiment of the invention is shown in the accompanying drawing in which:

Fig. 1 is a plan view of a motor vehicle with a beam-type steering axle;

Fig. 2 is a vertical sectional view of the vehicle body taken along line II—II of Fig. 1, and Fig. 3 is a plan view of a mercury switch.

Referring now to Fig. 1, the reference letter $v$ designates the front axle with the steerable wheels pivotable about trunnions $o, p$, while the rear axle is designated by the reference symbol $r$. Arranged in the central plane of the vehicle between the front and rear axles and rigidly connected with them is a torsion bar $c, d, e$. The torsion bar is bifurcated on both ends and secured to the axles by means of rubber sleeves $f$. Secured to the underside of the vehicle body is a cross member $i$ which carries an electric motor $k$ (Fig. 2). Via a transmission $h$ providing a suitable reduction, and conveniently constructed as a self-locking worm gear, the motor acts selectively in a right-hand or left-hand direction on a gear $g$ rigidly secured on the torsion bar.

In order to obtain a smooth and soft operation of the device, the torsion bar is divided at its center, its two parts being connected by a central piece $d$ which is joined to the bar portions $c, e$ by means of rubber joints or universal joints, $a$ and $b$.

When the vehicle is being driven over uneven roads or through turns, and the vehicle body is being tilted laterally or the position of its center of gravity is changed due to centrifugal force, uneven loading or the curvature of the road surface, one of the two mercury contacts $l$ or $m$ will be closed. This will energize the motor with such polarity that it will tilt the vehicle body towards the left or the right relative to the central portion $d$ of the torsion bar. In order to permit that the device is brought into operation by vibration or by insignificant inclinations of the vehicle body, the mercury contacts are arranged on the vehicle body in such a manner, that their angular position relative to the latter may be adjusted, for instance by means of adjusting screws $q$. Conveniently, the mercury contacts are constructed as shown in Fig. 3.

Additional manually operable contacts $n$ are provided for switching the electric motor $k$ so that the device described in the foregoing can also be used as a lifting jack. For this purpose one or more pivotable supporting members $w$ are provided on each side of the cross member $i$ which is attached to the vehicle body. These supporting members hinge downwardly on the corresponding side for lifting the wheels of the vehicle. If the motor $k$ is now started in the corresponding sense, the wheels on the jacked side of the vehicle will be lifted.

It is to be understood, that any other suitable prime mover may be used instead of the electric motor, or the power required may be taken off the vehicle engine. If the driver desires, he may also use the selectively operable switching means for the purpose of stabilization.

I claim:

1. A device for preventing lateral inclinations of motor vehicle bodies comprising a front axle, a rear axle, a resilient torsion bar arranged in the longitudinal center plane of the vehicle, said torsion bar having ends connected to said front and rear axle, a body movably mounted on the torsion rod and a motor drive connected to said body as well as to said torsion rod, said motor drive being adapted to return the body of said vehicle by said torsion bar into a predetermined position relative to the center of the gravity of the vehicle whenever the body thereof has been deflected from its correct position.

2. In a device as claimed in claim 1, members pivoted to the sides of the body of the vehicle and adapted to be swung downwardly, whereupon a lifting of the wheels of the vehicle may be obtained by rotation of the body by said motor drive and selectively operable means for switching-in said motor drive, said selectively operable means starting said motor drive so as to actuate said members.

3. In a device as claimed in claim 2, said motor drive including an electric motor adapted to rotate in either of two opposite directions, and a gear rigidly secured to said torsion bar, said gear being driven by said electric motor.

4. A device as claimed in claim 3, said electric motor being polarized so as to rotate in either of said two opposite directions, mercury switches being located on said body of said vehicle, said mercury switches being adapted to switch-in said electric motor for its rotation.

5. A device as claimed in claim 4, said mercury switches being adjustably mounted on the vehicle body.

6. A device as claimed in claim 5, and a cross member rigidly connected with said vehicle body and said electric motor being fixedly secured to said cross member.

7. A device as claimed in claim 6, and a self-locking transmission connecting said electric motor with said gear secured to said torsion bar.

8. A device as claimed in claim 1, said torsion bar being provided with a middle portion and two end portions, which are connected with said front and said rear axles, joints being arranged between said end portions and said middle portions of said torsion bar, said middle portions being connected with said electric motor.

9. A device as claimed in claim 8, and rubber sleeves connecting said end portions of said torsion bar with said front and said rear axles.

10. A device as claimed in claim 9, at least one of said end portions of said torsion bar being bifurcated and having forked ends connected by means of said rubber sleeves with the corresponding sleeve of said axles.

References Cited in the file of this patent

UNITED STATES PATENTS

| | | |
|---|---|---|
| 2,152,938 | Welch | Apr. 4, 1939 |
| 2,262,289 | Kolbe | Nov. 11, 1941 |
| 2,353,503 | Rost | July 11, 1944 |
| 2,525,988 | Willson | Oct. 17, 1950 |
| 2,644,699 | Weiertz | July 7, 1953 |